United States Patent
Xi et al.

(10) Patent No.: US 10,872,407 B2
(45) Date of Patent: Dec. 22, 2020

(54) METHOD AND APPARATUS FOR DETECTING DEFECTS, AND COMPUTER READABLE STORAGE MEDIUM

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Zhengdong Xi, Beijing (CN); GyuHyun Lee, Beijing (CN); Chaoqiang Liu, Beijing (CN); Jianhong Wang, Beijing (CN); Jinshun Wang, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 137 days.

(21) Appl. No.: 16/189,352

(22) Filed: Nov. 13, 2018

(65) Prior Publication Data
US 2019/0228515 A1   Jul. 25, 2019

(30) Foreign Application Priority Data
Jan. 22, 2018   (CN) .......................... 2018 1 0060335

(51) Int. Cl.
*G01N 21/88* (2006.01)
*G06T 7/00* (2017.01)
*G06T 7/60* (2017.01)

(52) U.S. Cl.
CPC ............ *G06T 7/001* (2013.01); *G06T 7/0004* (2013.01); *G06T 7/0008* (2013.01); *G06T 7/60* (2013.01); *G06T 2207/20076* (2013.01); *G06T 2207/20224* (2013.01); *G06T 2207/30108* (2013.01); *G06T 2207/30121* (2013.01)

(58) Field of Classification Search
CPC ......... G06T 7/001; G06T 7/0004; G06T 7/60; G06T 7/0008; G06T 2207/20076; G01N 21/88
See application file for complete search history.

(56) References Cited

U.S. PATENT DOCUMENTS

| | | | | |
|---|---|---|---|---|
| 6,169,282 B1 * | 1/2001 | Maeda | ................. | G01R 31/311 250/307 |
| 6,221,787 B1 * | 4/2001 | Ogata | ..................... | G03F 7/162 257/E21.259 |
| 7,315,647 B2 * | 1/2008 | Blake | .................... | G06T 11/001 382/173 |
| 7,411,669 B2 * | 8/2008 | Tomita | .................. | G03F 7/7065 356/237.1 |
| 7,599,545 B2 * | 10/2009 | Shibata | .............. | G01N 21/8806 348/125 |

(Continued)

*Primary Examiner* — Gregory M Desire

(57) ABSTRACT

A method of detecting defects includes: obtaining a gray-scale image of a substrate to be detected; obtaining a gray-scale difference g between different regions in the gray-scale image; calculating an estimated value of a film thickness difference d between the different regions in the gray-scale image according to the gray-scale difference g; and determining whether the substrate to be detected is qualified according to the estimated value of the film thickness difference d.

16 Claims, 7 Drawing Sheets

(56) References Cited

U.S. PATENT DOCUMENTS

| | | | | |
|---|---|---|---|---|
| 7,664,608 B2* | 2/2010 | Urano | G01N 21/9501 |
| | | | 702/40 |
| 9,355,442 B2* | 5/2016 | Iwanaga | H01L 21/67253 |
| 10,043,694 B2* | 8/2018 | Matsuo | H01L 21/67288 |
| 10,254,594 B2* | 4/2019 | Jiang | G02F 1/1341 |
| 10,359,367 B2* | 7/2019 | Fukazawa | G01N 21/9501 |
| 2002/0088952 A1* | 7/2002 | Rao | G01N 21/9501 |
| | | | 250/559.45 |
| 2013/0343632 A1* | 12/2013 | Urano | G06T 7/001 |
| | | | 382/149 |
| 2015/0104094 A1* | 4/2015 | Li | G01N 21/8851 |
| | | | 382/149 |
| 2019/0228515 A1* | 7/2019 | Xi | G06T 7/001 |

\* cited by examiner

METHOD AND APPARATUS FOR DETECTING DEFECTS, AND COMPUTER READABLE STORAGE MEDIUM

CROSS-REFERENCE TO RELATED APPLICATION

This application claims priority to Chinese Patent Application No. 201810060335.0, filed on Jan. 22, 2018, titled "METHOD AND APPARATUS FOR DETECTING DEFECTS", which is incorporated herein by reference in its entirety.

TECHNICAL FIELD

The present disclosure relates to the manufacturing technical field of display devices, and more particularly, to a method and an apparatus for detecting defects, and a computer readable storage medium.

BACKGROUND

Generally, the manufacturing process of a substrate constituting a display device (such as a liquid crystal display device) includes a step of coating a film layer. Taking the substrate being a Color Filter (CF) substrate as an example, the manufacturing process of the CF substrate includes a step of coating an Over Coating (OC) film and a step of coating a Photo Spacer (PS) film. If the thicknesses of the coated films are not uniform, macroscopic Mura effect (i.e. unevenness, speckles) may appear, causing problems such as vertical lines and spots, or other defects.

Therefore, after finishing the coating of a corresponding film layer in the substrate, it is necessary to detect defects such as Mura, which appear after the film layer is coated.

SUMMARY

In an aspect of the present disclosure, a method of detecting defects is provided. The method includes: obtaining a gray-scale image of a substrate to be detected; obtaining a gray-scale difference g between different regions in the gray-scale image; calculating an estimated value of a film thickness difference d between the different regions in the gray-scale image according to the gray-scale difference g; and determining whether the substrate to be detected is qualified according to the estimated value of the film thickness difference d.

In some embodiments, the step of obtaining a gray-scale difference g between different regions in the gray-scale image, includes: determining whether there is a gray-scale abnormal region in the gray-scale image, wherein the gray-scale abnormal region is a region in which a gray-scale value is too large or too small in the gray-scale image; defining the gray-scale abnormal region and a gray-scale normal region in the gray-scale image, and then proceeding to a next step in response to determining that there is a gray-scale abnormal region in the gray-scale image; determining that the substrate to be detected is qualified in response to determining that there is no gray-scale abnormal region in the gray-scale image; and calculating the gray-scale difference g between the gray-scale abnormal region and the gray-scale normal region. The step of calculating an estimated value of a film thickness difference d between the different regions in the gray-scale image according to the gray-scale difference g, includes: calculating an estimated value of a film thickness difference d between the gray-scale abnormal region and the gray-scale normal region according to the gray-scale difference g.

In some embodiments, the step of calculating the estimated value of the film thickness difference d between the gray-scale abnormal region and the gray-scale normal region according to the gray-scale difference g, includes: obtaining a relationship coefficient x representing a relationship between a sample film thickness difference and a sample gray-scale difference in sample data; and calculating the estimated value of the film thickness difference d to be a product of the relationship coefficient x and the gray-scale difference g.

In some embodiments, the step of obtaining a relationship coefficient x representing a relationship between a sample film thickness difference and a sample gray-scale difference in sample data, includes: collecting N sets of sample data, each set of sample data including a sample film thickness difference $d_i$ and a sample gray-scale difference $g_i$ corresponding to the sample film thickness difference $d_i$, wherein N is greater than or equal to 2, i ranges from 1 to N, and $d_1 \sim d_N$ differ from one another; calculating a sample relationship coefficient $x_i$ of each set of sample data by dividing the sample film thickness difference $d_i$ by the sample gray-scale difference $g_i$, wherein the sample relationship coefficient $x_i$ represents a relationship between the sample film thickness difference $d_i$ and the sample gray-scale difference $g_i$ in a corresponding set of sample data; and calculating the relationship coefficient x according to sample relationship coefficients $x_1 \sim x_N$ of the N sets of sample data.

In some embodiments, the step of calculating the relationship coefficient x according to sample relationship coefficients $x_1 \sim x_N$ of the N sets of sample data, includes: setting at least one determination range of the gray-scale difference, a collection of the at least one determination range being a continuous numerical range covering sample gray-scale differences $g_1 \sim g_N$ of the N sets of sample data; and calculating an average value of sample relationship coefficients corresponding to sample gray-scale differences falling into each determination range to obtain a relationship coefficient x corresponding to a corresponding determination range.

In some embodiments, before the step of calculating the estimated value of the film thickness difference d to be a product of the relationship coefficient x and the gray-scale difference g, the method further includes: determining a determination range into which the gray-scale difference g falls, and then determining a relationship coefficient x corresponding to the determination range.

In some embodiments, the step of determining whether the substrate to be detected is qualified according to the estimated value of the film thickness difference d, includes: determining a fluctuation range, which ranges from (a difference between d and y) to (a sum of d and y), of the estimated value of the film thickness difference d, wherein y is a compensation coefficient representing an allowable error of the estimated value of the film thickness difference d relative to an actual value of the film thickness difference d' of the substrate to be detected; comparing the fluctuation range with a pre-set threshold value of the film thickness difference $d_{max}$, wherein the threshold value of the film thickness difference $d_{max}$ is a maximum film thickness difference allowed for the substrate to be qualified; determining that the substrate to be detected is qualified in response to the sum of d and y being smaller than or equal to $d_{max}$; determining that the substrate to be detected is unqualified in response to the difference between d and y being greater than $d_{max}$; measuring the actual value of the film thickness difference d' in response to the difference between d and y being smaller than or equal to $d_{max}$ and the sum of d and y being greater than $d_{max}$, and comparing the actual value of the film thickness difference d' with the threshold value of the film thickness difference $d_{max}$: determining that the substrate to be detected is qualified in response to d' being smaller than or equal to $d_{max}$; determining that the substrate to be detected is unqualified in response to d' being greater than $d_{max}$.

In some embodiments, the step of obtaining a gray-scale image of a substrate to be detected, includes: capturing an image of the substrate to be detected to obtain a captured image; and converting the captured image into a gray-scale image.

In some embodiments, the step of determining whether there is a gray-scale abnormal region in the gray-scale image, wherein the gray-scale abnormal region is a region in which a gray-scale value is too large or too small in the gray-scale image; defining the gray-scale abnormal region and a gray-scale normal region in the gray-scale image in response to determining that there is a gray-scale abnormal region in the gray-scale image, and then proceeding to a next step; determining if the substrate to be detected is qualified in response to determining that there is no gray-scale abnormal region in the gray-scale image, includes: obtaining a gray-scale value of each image point in the gray-scale image; determining whether the gray-scale value of each image point is normal; determining that there is a gray-scale abnormal region in the gray-scale image in response to determining that a gray-scale value of an image point is abnormal, and defining a region corresponding to image points with abnormal gray-scale values as a gray-scale abnormal region, and a region corresponding to image points with normal gray-scale values as a gray-scale normal region, and then proceeding to the step of calculating the gray-scale difference g between the gray-scale abnormal region and the gray-scale normal region; and determining that there is no gray-scale abnormal region in the gray-scale image in response to determining that ray-scale values of all image points are normal, and then determining that the substrate to be detected is qualified.

In some embodiments, each of the image points includes a single pixel in the gray-scale image. In some other embodiments, each of the image points comprises at least a column of pixels in the gray-scale image. In some other embodiments, each of the image points comprises at least a row of pixels in the gray-scale image.

In some embodiments, the step of calculating the gray-scale difference g between the gray-scale abnormal region and the gray-scale normal region, includes: determining a maximum gray-scale value in the gray-scale values of image points with abnormal gray-scale values in a case where gray-scale values of image points with abnormal gray-scale values are larger than gray-scale values of image points with normal gray-scale values, and calculating an average gray-scale value of image points with normal gray-scale values; determining a minimum gray-scale value in the gray-scale values of image points with abnormal gray-scale values in a case where the gray-scale values of image points with abnormal gray-scale values are smaller than the gray-scale values of image points with normal gray-scale values, and calculating an average gray-scale value of image points with normal gray-scale values; and subtracting the average gray-scale value from the maximum gray-scale value or subtracting the minimum gray-scale value from the average gray-scale value to obtain the gray-scale difference g.

In another aspect of the present disclosure, an apparatus of detecting defects is provided. The apparatus includes a gray-scale image acquisition device and a processor. The gray-scale image acquisition device is configured to obtain a gray-scale image of a substrate to be detected. The processor is connected to the gray-scale image acquisition device, and is configured to obtain a gray-scale difference g between different regions in the gray-scale image, calculate an estimated value of a film thickness difference d between the different regions in the gray-scale image according to the gray-scale difference g, and determine whether the substrate to be detected is qualified according to the estimated value of the film thickness difference d.

In some embodiments, the processor is configured to: determine whether there is a gray-scale abnormal region in the gray-scale image; define the gray-scale abnormal region and a gray-scale normal region in the gray-scale image in response to determining that there is the gray-scale abnormal region in the gray-scale image; determine that the substrate to be detected is qualified in response to determining that there is no gray-scale abnormal regions in the gray-scale image; calculate the gray-scale difference g between the gray-scale abnormal region and the gray-scale normal region; calculate an estimated value of a film thickness difference d between the gray-scale abnormal region and the gray-scale normal region according to the gray-scale difference g; and determine whether the substrate to be detected is qualified according to the estimated value of the film thickness difference d.

In some embodiments, the apparatus further includes a memory connected to the processor. The memory is configured to store a relationship coefficient x; wherein the relationship coefficient x represents a relationship between a sample film thickness difference and a sample gray-scale difference in sample data. The processor is configured to calculate a gray-scale difference g between the gray-scale abnormal region and the gray-scale normal region, read the relationship coefficient x from the memory, and calculate the estimated value of the film thickness difference d between the gray-scale abnormal region and the gray-scale normal region to be a product of the relationship coefficient x and the gray-scale difference g.

In some embodiments, the processor is further configured to determine a defect type of a corresponding region of the substrate to be detected according to a distribution of image points in the gray-scale abnormal region.

In some embodiments, the apparatus further includes an alarm connected to the processor. The alarm is configured to send an alarm in response to determining that the substrate to be detected is unqualified.

In some embodiments, the gray-scale image acquisition device includes a linear camera.

In yet another aspect of the present disclosure, a non-transitory computer-readable storage medium is provided, which stores executable instructions that, when executed by apparatus for detecting defects, cause the apparatus to perform steps of the method of detecting defects described above.

DETAILED DESCRIPTION

In order to make the objects, technical solutions and advantages of embodiments of the present disclosure clearer, the technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

In the related art, taking the CF substrates as an example, a process of detecting defects is roughly as follows. First, the inspector observes the surface of each of the CF substrates with the naked eye, so as to determine CF substrates with serious or obvious defects as unqualified products. Then a professional measuring equipment is used to measure a film thickness of each of remaining CF substrates to obtain a film thickness difference between different regions of each of the remaining CF substrates. Last, whether a corresponding CF substrate is qualified is determined according to the film thickness difference.

Since the detection process relies on the naked eye observation and experience of the inspector, the detection result may be greatly affected by human factors and the accuracy is poor, resulting in a decrease in the percent of pass of the detected product. In addition, in the actual detection process, since for most of the CF substrates, after the naked eye inspection, the inspectors cannot determine whether the CF substrates are qualified or not, and the professional measuring equipment will be used to measure the film thickness of each of the CF substrates and thereby determine if the defect is serious. The measurement process cycle is quite long, resulting in a decrease in production efficiency.

Figure 1:
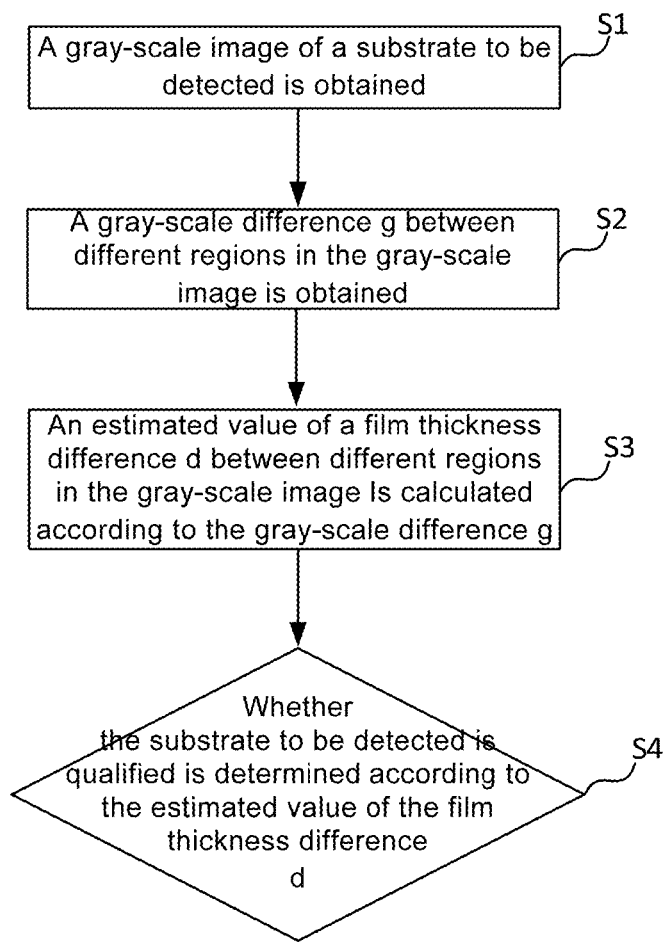
FIG. 1 is a flowchart of a method of detecting defects according to some embodiments of the present disclosure.

Regarding the above problems, some embodiments of the present disclosure provide a method of detecting defects. As shown in FIG. 1, the method includes the following steps S1-S4.

In S1, a gray-scale image of a substrate to be detected is obtained.

In S2, a gray-scale difference g between different regions in the gray-scale image is obtained.

In S3, an estimated value of a film thickness difference d between different regions in the gray-scale image is calculated according to the gray-scale difference g.

In S4, whether the substrate to be detected is qualified is determined according to the estimated value of the film thickness difference d.

Based on the above method of detecting defects, the estimated value of the film thickness difference between different regions of the substrate to be detected is calculated according to the gray-scale difference g between the different regions in the gray-scale image of the substrate to be detected, and thereby it may be determined whether the substrate to be detected is qualified according to the estimated value of the film thickness difference. In this way, it is realized to automatically detect the substrate to be detected and determine whether the substrate is qualified. There is no need for an inspector to observe the substrate to be detected and determine whether the substrate is qualified based on experience. Moreover, the above method of detecting defects determines whether the substrate is qualified by calculating an exact estimated value of film thickness difference, which greatly improves defect detection accuracy and thereby improves the percent of pass of a product. At the same time, since it is realized in the above method of detecting defects to automatically inspect the substrate to be detected and determine whether the substrate is qualified, there is no need for an inspector to observe the substrate to be detected and to measure the film thickness by using a professional measuring equipment for substrates which the inspector cannot decide whether they are qualified or not through naked eye observation. As a result, inspection time is greatly saved, and production efficiency is improved.

Figure 2:
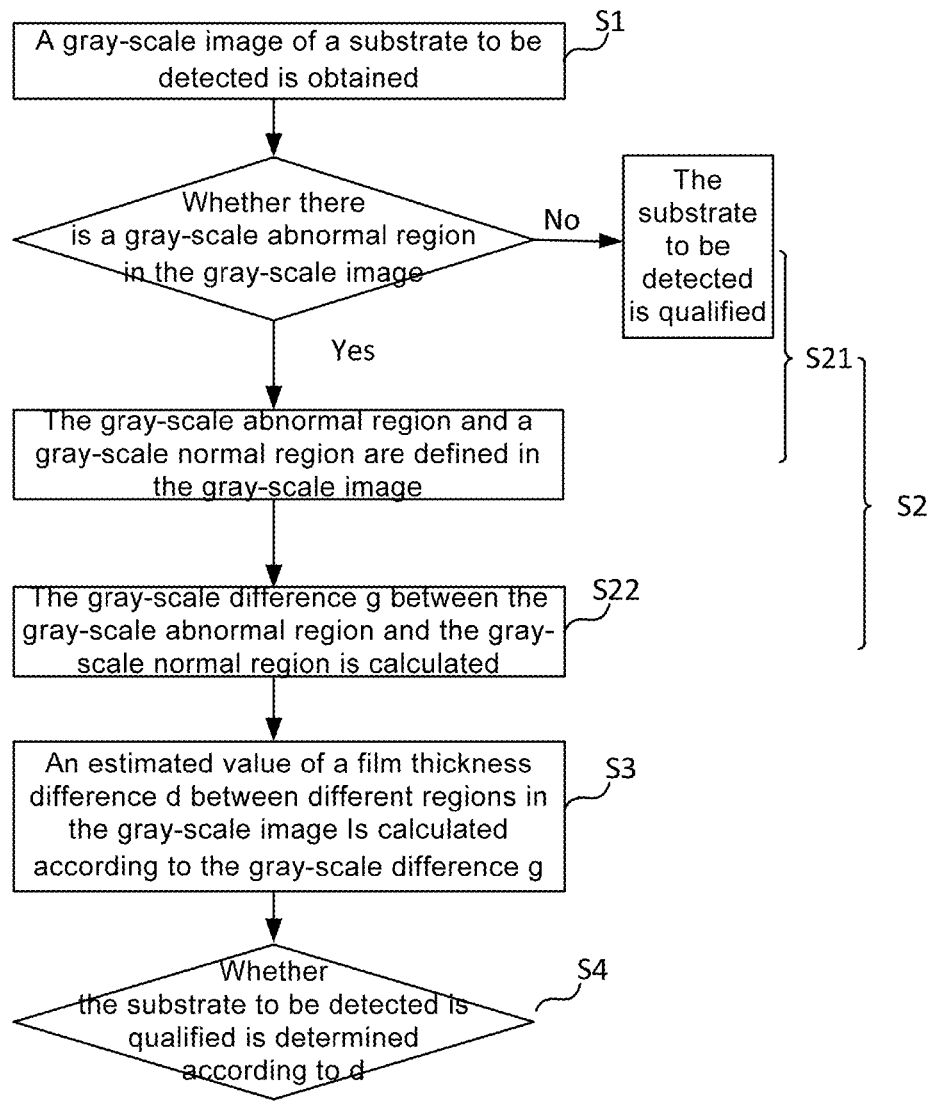
FIG. 2 is a flowchart of another method of detecting defects according to some embodiments of the present disclosure.

In some embodiment, as shown in FIG. 2, the above step S2 includes the following steps S21 and S22.

In S21, whether there is a gray-scale abnormal region in the gray-scale image is determined. If yes, the gray-scale abnormal region and a gray-scale normal region are defined in the gray-scale image, and then the process proceeds to a next step S22. If no, it is determined that the substrate to be detected is qualified. The gray-scale abnormal region is a region in which a gray-scale value is too large or too small in the gray-scale image.

In S22, the gray-scale difference g between the gray-scale abnormal region and the gray-scale normal region is calculated.

Correspondingly, the above step S3 includes: calculating the estimated value of the film thickness difference d between the gray-scale abnormal region and the gray-scale normal region according to the gray-scale difference g.

In this way, through the above step S21, in a case where there is no gray-scale abnormal region in the gray-scale image of the substrate to be detected, it is, for example, directly determined that the substrate to be detected is qualified. In addition, in a case where there is a gray-scale abnormal region in the gray-scale image of to the substrate to be detected, the next step S22 will be performed. In step S22, the gray-scale difference g between the gray-scale abnormal region and the gray-scale normal region is calculated, and the estimated value of the film thickness difference between the gray-scale abnormal region and the gray-scale normal of the substrate to be detected is obtained according to the gray-scale difference g. And then, it is determined whether the substrate to be detected is qualified according to the estimated value of film thickness difference, and therefore it is realized to automatically detect the substrate to be detected and determine whether the substrate is qualified.

The above steps are further described below in order to describe in detail the above method of detecting defects.

Figure 3:
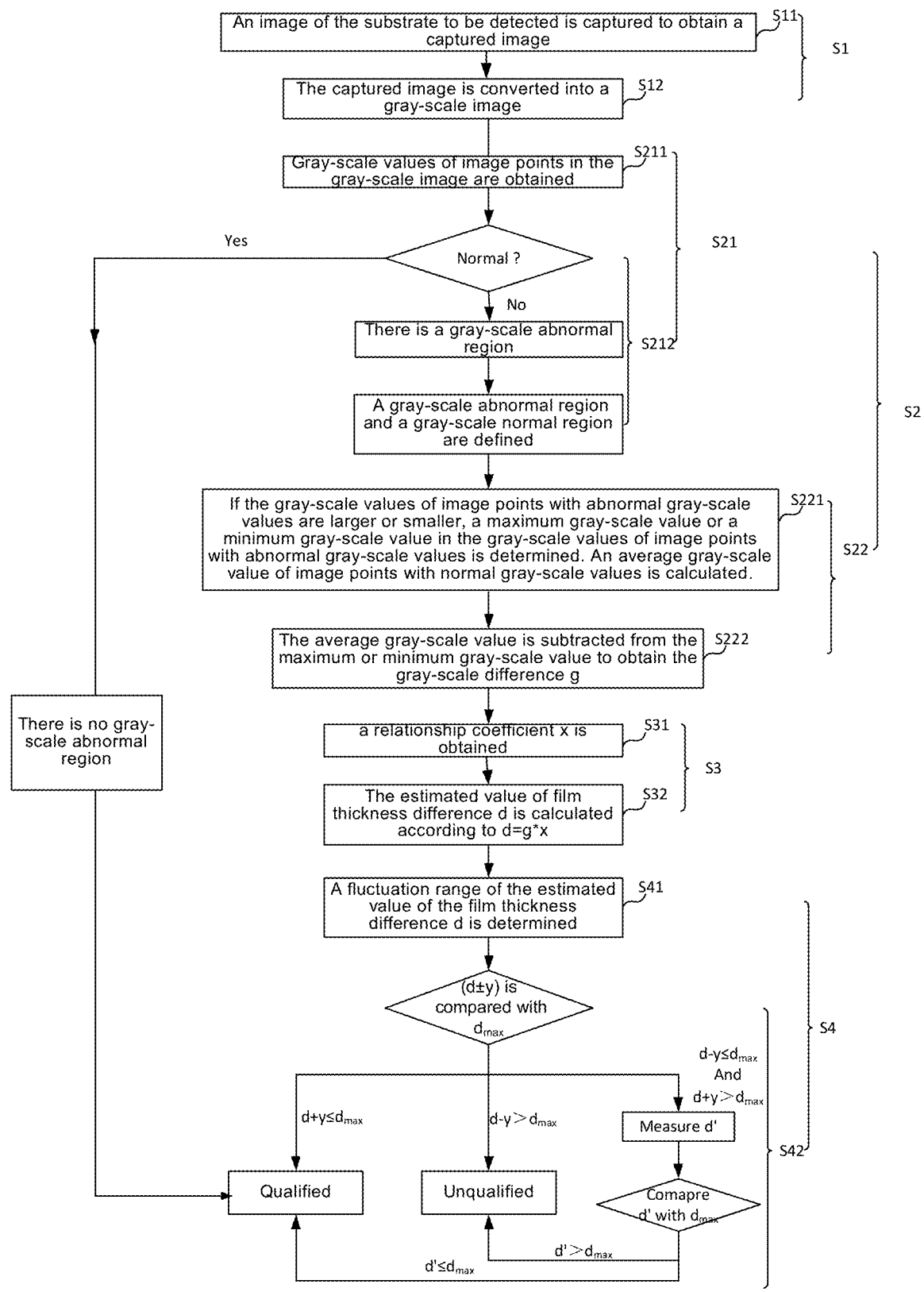
FIG. 3 is a flowchart of yet another method of detecting defects according to some embodiments of the present disclosure.

In some embodiments, referring to FIG. 3, the foregoing step S1 includes the following steps S11 and S12.

In S11, an image of the substrate to be detected is captured to obtain a captured image.

The substrate to be detected includes, for example, a base substrate and a film covered thereon, and the film is, for example, a transparent film formed by, for example, a coating process, such as an OC film in a CF substrate, or a PS film in a CF substrate before a photo-etching process, or another transparent film formed by a coating process in a CF substrate or a Thin Film Transistor (TFT) substrate.

The film formed mentioned above is prone to have the problem of uneven thickness due to the limitation of the In addition, for example, a linear camera is employed when capturing an image of the substrate to be detected.

In S12, the captured image is converted into a gray-scale image.

Figure 4:
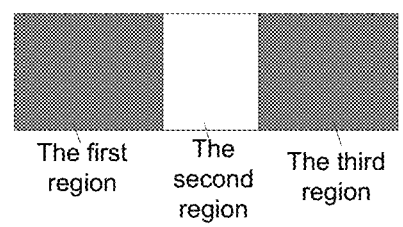
FIG. 4 is a partial view of a gray-scale image of a substrate to be detected according to some embodiments of the present disclosure.

FIG. 4 is a partial view of a gray-scale image of the substrate to be detected. For example, the partial view includes a first region, a second region, and a third region.

It will be noted that the partial view of the gray-scale image obtained is divided into three regions here only for convenience of subsequent description, and there is no special meaning. In fact, the gray-scale image obtained in step S12 is a complete image, and there are no special identifiers in the image.

In some embodiments, referring to FIG. 3, the foregoing step S21 includes the following steps S211 and S212.

In S211, gray-scale values of image points in the gray-scale image are obtained according to the gray-scale image of the substrate to be detected.

Here, the partial view of the gray-scale image shown in FIG. 4 is still taken as an example to describe the step S211 above in detail. In the partial view of the gray-scale image, the gray-scale value of each pixel (also referred to as an image unit, wherein one image unit or one pixel corresponds to the smallest resolution unit of an camera that captures the image of the substrate to be detected) may be obtained, so that the data in Table 1 below may be obtained.

TABLE 1

| Gray-scale value of the first region | | | | | | | Gray-scale value of the second region | | | | | | | | Gray-scale value of the third region | | | |
|---|---|---|---|---|---|---|---|---|---|---|---|---|---|---|---|---|---|---|
| 128 | 128 | 128 | 128 | 129 | 130 | 131 | 132 | 133 | 134 | 135 | 134 | 132 | 131 | 130 | 129 | 128 | 128 | 128 | 128 |
| 128 | 128 | 128 | 128 | 129 | 130 | 131 | 132 | 133 | 134 | 135 | 134 | 132 | 131 | 130 | 129 | 128 | 128 | 128 | 128 |
| 128 | 128 | 128 | 128 | 129 | 130 | 131 | 132 | 133 | 134 | 135 | 134 | 132 | 131 | 130 | 129 | 128 | 128 | 128 | 128 |
| 128 | 128 | 128 | 128 | 129 | 130 | 131 | 132 | 133 | 134 | 135 | 134 | 132 | 131 | 130 | 129 | 128 | 128 | 128 | 128 |
| 128 | 128 | 128 | 128 | 129 | 130 | 131 | 132 | 133 | 134 | 135 | 134 | 132 | 131 | 130 | 129 | 128 | 128 | 128 | 128 |
| 128 | 128 | 128 | 128 | 129 | 130 | 131 | 132 | 133 | 134 | 135 | 134 | 132 | 131 | 130 | 129 | 128 | 128 | 128 | 128 |
| 128 | 128 | 128 | 128 | 129 | 130 | 131 | 132 | 133 | 134 | 135 | 134 | 132 | 131 | 130 | 129 | 128 | 128 | 128 | 128 |
| 128 | 128 | 128 | 128 | 129 | 130 | 131 | 132 | 133 | 134 | 135 | 134 | 132 | 131 | 130 | 129 | 128 | 128 | 128 | 128 |
| 128 | 128 | 128 | 128 | 129 | 130 | 131 | 132 | 133 | 134 | 135 | 134 | 132 | 131 | 130 | 129 | 128 | 128 | 128 | 128 |
| 128 | 128 | 128 | 128 | 129 | 130 | 131 | 132 | 133 | 134 | 135 | 134 | 132 | 131 | 130 | 129 | 128 | 128 | 128 | 128 | forming process (for example, the coating process), and therefore it is necessary to perform defect detection to examine a thickness uniformity. The better the thickness uniformity of the film, the smaller the defect; or there is no defects. The worse the thickness uniformity of the film, the more serious the defects. The defects mentioned here mainly include the Mura effect.

In some embodiments, the objects targeted by the method of detecting defects include a substrate that is detected by, for example, a method of reflection or refraction. The "method of reflection or refraction" here refers to a method of irradiating a substrate to be detected with a light source to cause reflection or refraction of light in a transparent film of the substrate to be detected, capturing an image of the substrate to be detected, and then examining a defect of the substrate to be detected according to the captured image.

In the above method, for example, a reflective or refracting light source is used as the illumination device during the image-capturing process. In some examples, the light source is placed on a same side of the substrate to be detected as the photographic device. Alternatively, the light source and the photographic device are placed on opposite sides of the substrate to be detected.

In the Table 1 above, each numerical value represents a gray-scale value of a single pixel. In some examples, each image point includes a single pixel in the gray-scale image. In some other examples, each image point includes at least one column of pixels in the gray-scale image. In some other examples, each image point includes at least one row of pixels in the gray-scale image.

Herein, in a case where each image point includes a plurality of columns of pixels in the gray-scale image, the plurality of columns of pixels are a plurality of adjacent, sequentially arranged columns of pixels in the gray-scale image. Likewise, in a case where each image point includes a plurality of rows of pixels in the gray-scale image, the plurality of rows of pixels are a plurality of adjacent, sequentially arranged rows of pixels in the gray-scale image.

Figure 5:
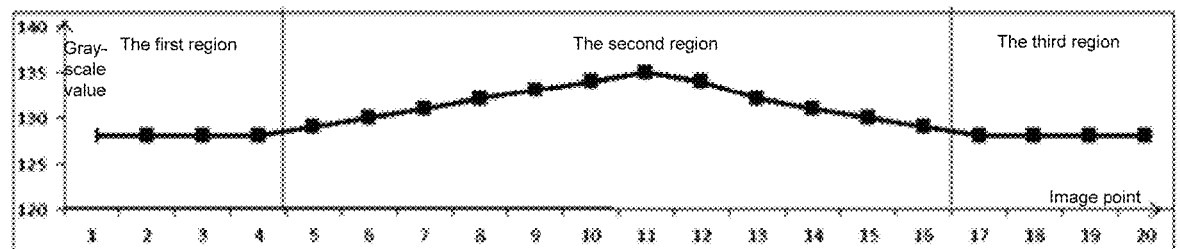
FIG. 5 is a curve chart of gray-scale values of image points in the partial view of the gray-scale image shown in FIG. 4.

For example, in order to simplify the calculation process, each column of image units are regarded as one image point, thereby a curve shown in FIG. 5 is obtained. The partial view of the gray-scale image includes a total of 20 image points, and the gray-scale value of each image point is an average value of the gray-scale values of a corresponding column of pixels.

As can be seen from the curve in FIG. 5, in the first region and the third region, the gray-scale value of each image point is 128, and the gray-scale values of image points in the second region are generally higher than the gray-scale value of each image point in the first region and the third region. In a direction from the first region to the third region, the gray-scale value of the eleventh image point in the second region is the highest at 135.

It will be noted that the number of pixel points in Table 1 and the gray-scale values thereof are only examples, and the number of pixel points in the gray-scale image of an actual substrate to be detected may be far more than 20. Moreover, the gray-scale values of the columns of pixels in various regions in the gray-scale image may not be as uniform as shown in Table 1, and may fluctuate in a small range. These situations are within the scope of the disclosure of the embodiments of the present disclosure.

In S212, whether a gray-scale value of each image point in the gray-scale image is normal is determined. If a gray-scale value of an image point is abnormal, it is determined that there is a gray-scale abnormal region in the gray-scale image. In addition, a region corresponding to the image point with the abnormal gray-scale value is defined as a gray-scale abnormal region, and a region corresponding to image points with normal gray-scale values is defined as a gray-scale normal region. Then the process proceeds to step S22. If gray-scale values of all image points are normal, it is determined that there is no gray-scale abnormal regions in the gray-scale image, and then it is determined that the substrate to be detected is qualified.

Figure 6:
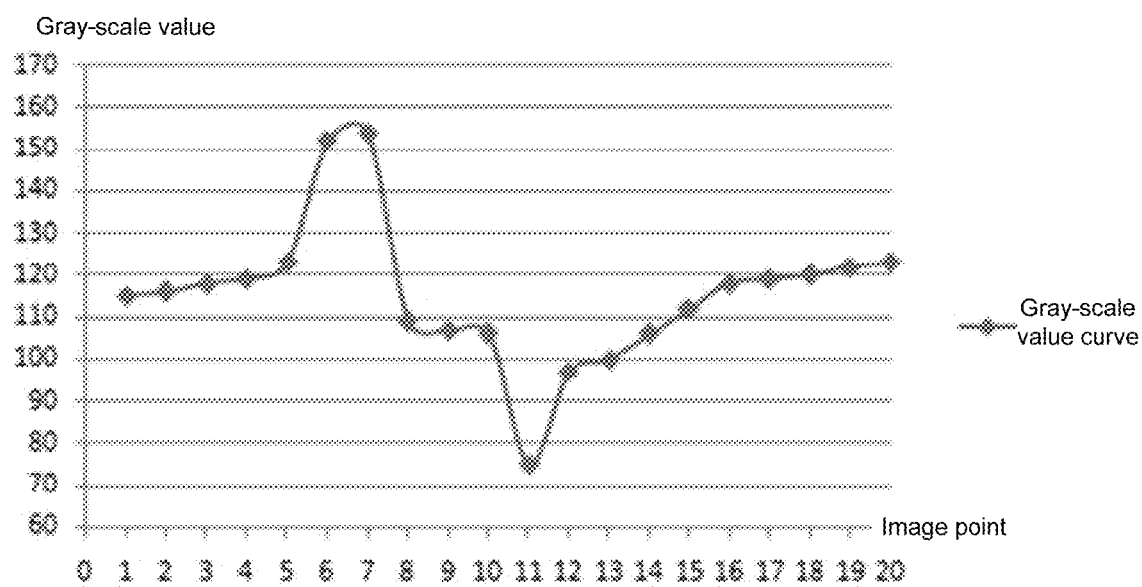
FIG. 6 is a curve chart of gray-scale values of image points in a gray-scale image of a substrate to be detected according to some embodiments of the present disclosure.

In some examples, a general process of the step S212 above is described below with reference to FIG. 6. FIG. 6 is a curve chart of gray-scale values of image points in a gray-scale image of a substrate to be detected according to some embodiments of the present disclosure.

Figure 7:
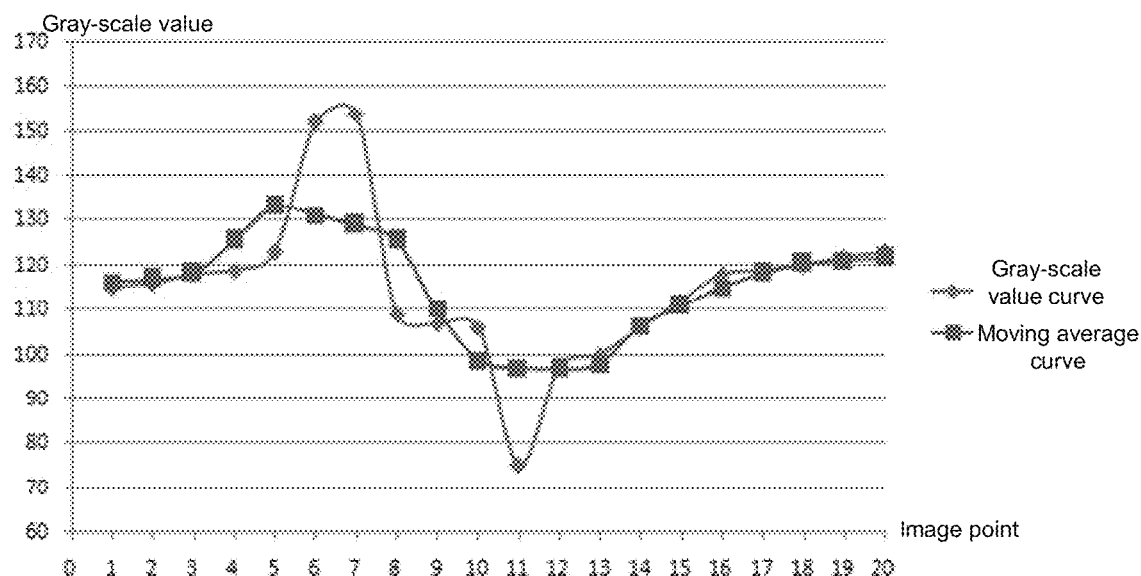
FIG. 7 is another curve chart of gray-scale values of image points in a gray-scale image of a substrate to be detected according to some embodiments of the present disclosure.

As shown in FIG. 6, according to the gray-scale values of the image points obtained in step S211, a gray-scale value curve is obtained (for example, drawn). And then, as shown in FIG. 7, a moving average curve is drawn according to a set moving average, so as to smooth the previously drawn gray-scale value curve. The process of setting the moving average is roughly as follows. The obtained gray-scale image of the substrate to be detected is divided into a plurality of small regions each of which corresponds to an image point, and the average value of the gray-scale values of each small region is calculated and determined as a set moving average of a corresponding image point. Further, as shown in FIG. 8, based on set upper limit and lower limit values, an upper limit curve and a lower limit curve of the gray-scale values of image points are respectively drawn on the basis of the set moving average curve.

Among the image points in the gray-scale value curve, image points within the range defined by the upper limit curve and the lower limit curve are image points with normal gray-scale values, and image points outside the range defined by the upper limit curve and the lower limit curve are image points with abnormal gray-scale values.

If there is an image point in the gray-scale value curve that is outside the range defined by the upper limit curve and the lower limit curve, it indicates that there is an image point with an abnormal gray-scale value in the gray-scale image of the substrate to be detected. Therefore, it may be determined that there is a gray-scale abnormal region in the gray-scale image, and that a region corresponding to the image point with the abnormal gray-scale value is a gray-scale abnormal region, and a region corresponding to image points with normal gray-scale values is a gray-scale normal region.

Figure 8:
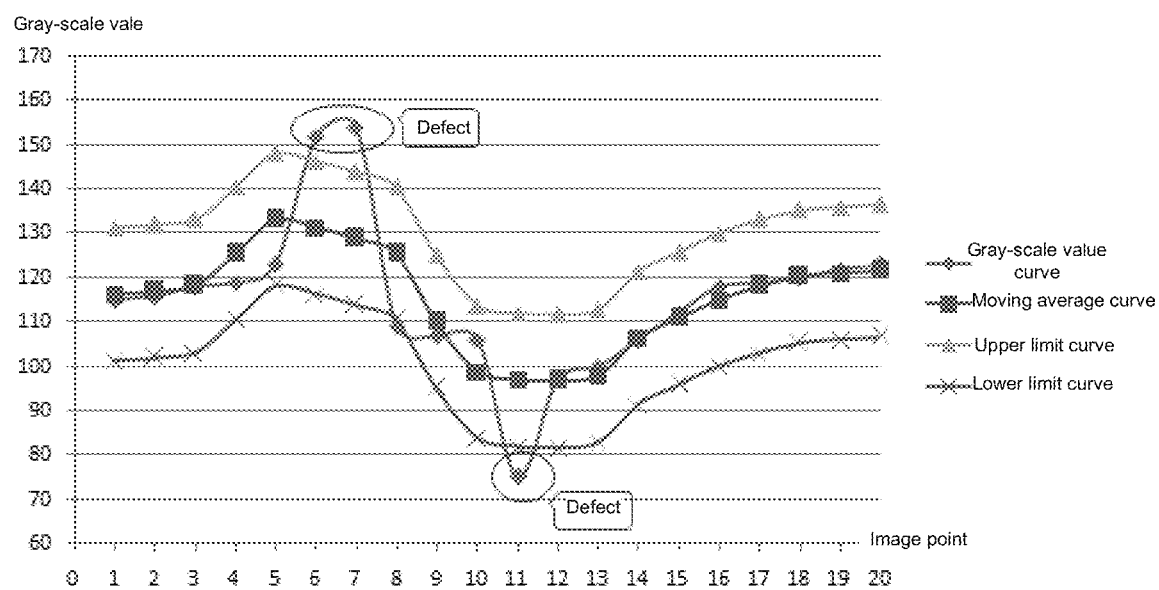
FIG. 8 is a yet another curve chart of gray-scale values of image points in a gray-scale image of a substrate to be detected according to some embodiments of the present disclosure.

For example, the sixth, seventh, and eleventh image points circled out in FIG. 8 are image points with abnormal gray-scale values, and the corresponding regions are gray-scale abnormal regions. Correspondingly, the remaining image points within the range defined by the upper limit curve and the lower limit curve are image points with normal gray-scale values, and the corresponding regions are gray-scale normal regions.

If all the image points in the gray-scale value curve are within the range defined by the upper limit curve and the lower limit curve, then it indicates that the gray-scale values of all the image points in the gray-scale image of the substrate to be detected are normal, and there is no image point with abnormal gray-scale value. Therefore, it is determined that there is no gray-scale abnormal region in the gray-scale image, and thus it is determined that the substrate to be detected is qualified.

It will be noted that, from the above process, it may be known that the number of image points with abnormal gray-scale values that can be detected may be controlled through the set moving average, the upper limit, and the lower limit. For example, if high accuracy is required in defect detection, a normal gray-scale range determined by the moving average, the upper limit, and the lower limit is set relatively small, that is, the range defined by the upper limit curve and the lower limit curve is set relatively small. Consequently, in a case where there are image points with abnormal gray-scale values in the gray-scale image of the substrate to be detected, the number of the image points with abnormal image points that can be detected will be larger. As a result, the accuracy of the defect detection will be higher.

In addition, the process of determining whether there is a gray-scale abnormal region in the gray-scale image, and determining where (one region or several regions) the gray-scale abnormal region is located, and where (one region or several regions) the gray-scale normal region is located may be completed by a defect inspection machine (generally referred to as a Mura inspection machine) through a corresponding defect point detection program.

In some embodiments, referring to FIG. 3, the step S22 above includes the following steps S221 and S222.

In S221, in a case where the gray-scale values of image points with abnormal gray-scale values are larger than the gray-scale values of image points with normal gray-scale values, a maximum gray-scale value in the gray-scale values of image points with abnormal gray-scale values is determined, and an average gray-scale value of image points with normal gray-scale values is calculated. In a case where the gray-scale values of image points with abnormal gray-scale values are smaller than the gray-scale values of image points with normal gray-scale values, a minimum gray-scale value in the gray-scale values of image points with abnormal gray-scale values is determined, and an average gray-scale value of image points with normal gray-scale values is calculated.

In S222, the average gray-scale value of image points with normal gray-scale values is subtracted from the maximum gray-scale value of image points with abnormal gray-scale values, or the minimum gray-scale value of image points with abnormal gray-scale values is subtracted from the average gray-scale value image points with normal gray-scale values to obtain the gray-scale difference g between the gray-scale abnormal region and the gray-scale normal region.

It will be noted that, since an estimated value of the film thickness difference of the substrate to be detected is obtained according to the gray-scale difference g, and then whether the substrate to be detected is qualified is determined according to the estimated value of the film thickness difference, in the step S222 above, in a case where the gray-scale values of image points with abnormal gray-scale values are larger than the gray-scale values of image points with normal gray-scale values, a maximum gray-scale value of image points with abnormal gray-scale values and an average gray-scale value of image points with normal gray-scale values are compared to calculate the gray-scale difference g, that is, the average gray-scale value is subtracted from the maximum gray-scale value to obtain the gray-scale difference g.

Among the image points with abnormal gray-scale values, if a film thickness difference corresponding to an image point with the largest gray-scale difference (i.e., the image point with the maximum gray-scale value) meets the requirements of production design, since the gray-scale values of remaining image points are all smaller than the maximum gray-scale value, according to the principle of data processing in statistics, film thickness differences corresponding to remaining image points with abnormal gray-scale values also meet the requirements of production design. On the contrary, among the image points with abnormal gray-scale values, if a corresponding film thickness difference of an image point with the largest gray-scale difference (i.e., the image point with the maximum gray-scale value) does not meet the requirements of production design, it may be directly determined that the substrate to be detected is unqualified. In this way, the uniformity of film thickness of substrates determined to be qualified may be increased, and the percent of pass of the substrate may be improved.

Similarly, in the step S222 above, in a case where the gray-scale values of image points with abnormal gray-scale values are smaller than the gray-scale values of image points with normal gray-scale values, a minimum gray-scale value of image points with abnormal gray-scale values and an average gray-scale value of image points with normal gray-scale values are compared to calculate the gray-scale difference g, that is, the minimum gray-scale value is subtracted from the average gray-scale value to obtain the gray-scale difference value g.

Among the image points with abnormal gray-scale values, if a film thickness difference corresponding to an image point with the largest gray-scale difference (i.e., the image point with the minimum gray-scale value) meets the requirements of production design, since the gray-scale values of remaining image points are all larger than the minimum gray-scale value, according to the principle of data processing in statistics, film thickness differences corresponding to remaining image points with abnormal gray-scale values also meet the requirements of production design. On the contrary, among the image points with abnormal gray-scale values, if a film thickness difference corresponding to an image point with the largest gray-scale difference (i.e., the image point with the minimum gray-scale value) does not meet the requirements of production design, it may be directly determined that the substrate to be detected is unqualified. In this way, the uniformity of film thickness of substrates determined to be qualified may be increased, and the percent of pass of the substrate may be improved.

The method of calculating the gray-scale difference g in cases where the gray-scale values of image points with abnormal gray-scale values are larger than or smaller than the gray-scale values of image points with normal gray-scale values is described above. However, in some other embodiments, other calculation methods are also adopted. For example, the average gray-scale value of image points with abnormal gray-scale values and the average gray-scale value of image points with normal gray-scale values are calculated, and one average gray-scale value is subtracted from another to obtain the gray-scale difference g.

In some embodiments, referring to FIG. 3, the step S3 above includes the following steps S31 and S32.

In S31, a relationship coefficient x is obtained. The relationship coefficient x represents a relationship between a sample film thickness difference and a sample gray-scale difference in sample data.

S32, the estimated value of film thickness difference d is calculated to be a product of the relationship coefficient x and the gray-scale difference g. That is, $d = g \times x$.

Figure 9:
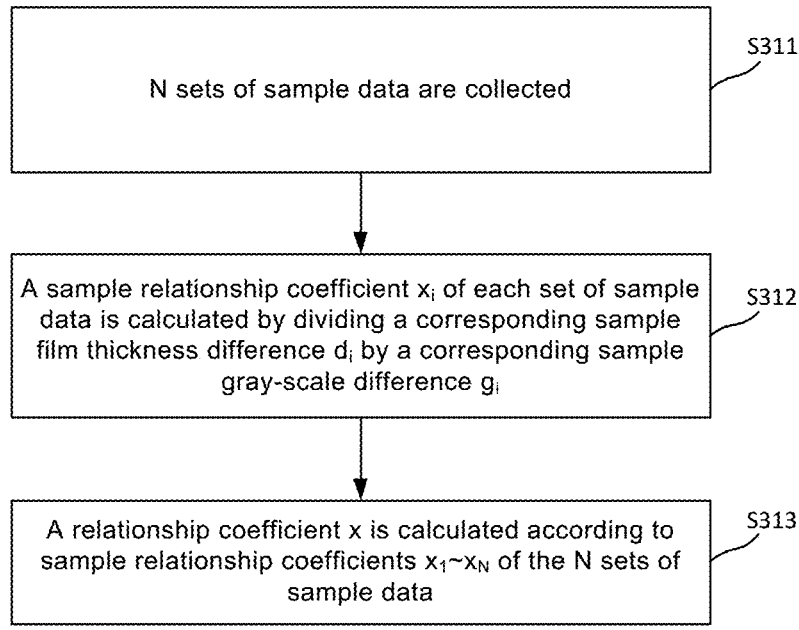
FIG. 9 is a flowchart of a method of obtaining a relationship coefficient x according to some embodiments of the present disclosure.

In some embodiments, as shown in FIG. 9, the process of the step S31 above includes the following steps S311-S313.

In S311, N sets of sample data are collected. Each set of sample data includes a sample film thickness difference $d_i$ and a sample gray-scale difference $g_i$ corresponding to the sample film thickness difference $d_i$, wherein $N \geq 2$, $i = 1 \sim N$, and $d_1 \sim d_N$ are differ from one another.

In the step S311 above, as for collection of sample data, for example, N pieces of previously detected substrates are selected as sample substrates, and a sample film thickness difference $d_i$ and a corresponding sample gray-scale difference $g_i$ between a gray-scale abnormal region and a gray-scale normal region of each of the substrates may be collected as the sample data.

Alternatively, N pieces of sample substrates each with a sample thickness difference $d_i$ are specifically produced, wherein $N \geq 2$, and $i = 1 \sim N$. That is, film thickness differences of the N pieces of sample substrates are $d_1 \sim d_N$ respectively, and $d_1 \sim d_N$ differ from one another. Then, the gray-scale image of each sample substrate is obtained, and the gray-scale difference $g_i$ between the gray-scale abnormal region and the gray-scale normal region in the gray-scale image of each sample substrate is calculated. As for the method of obtaining the gray-scale image of the sample substrate, reference may be made to the process described in the above steps S11 and S12, and details are not described herein again. As for the method of calculating the gray-scale difference $g_i$ of the sample substrate, reference may be made to the process described in steps S221 and S222, and details are not described herein again.

In S312, a sample relationship coefficient $x_i$ of each set of sample data is calculated by dividing a corresponding sample film thickness difference $d_i$ by a corresponding sample gray-scale difference $g_i$, that is, according to a relational expression $x_i = d_i / g_i$. The sample relationship coefficient $x_i$ represents a relationship between the sample film thickness difference $d_i$ and the sample gray-scale difference $g_i$ in a corresponding set of sample data.

In S313, a relationship coefficient x is calculated according to sample relationship coefficients $x_1 \sim x_N$ of the N sets of sample data.

Figure 10:
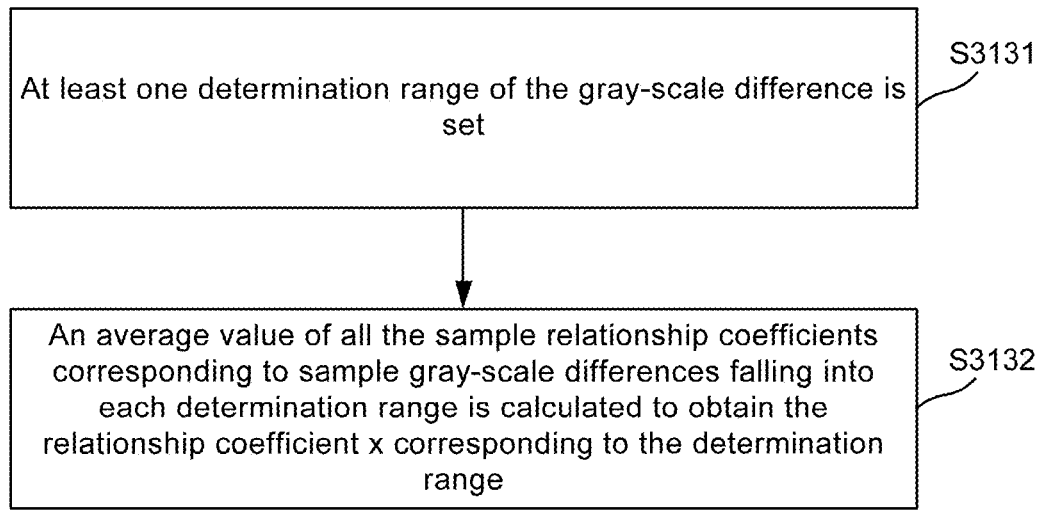
FIG. 10 is a flow chart of calculating the relationship coefficient x according to sample relationship coefficients $x_1 \sim x_N$ in the method shown in FIG. 9.

In some embodiments, as shown in FIG. 10, the above step S313 includes the following steps S3131 and S3132.

In S3131, at least one determination range of the gray-scale difference is set. A collection of the at least one determination range is a continuous numerical range covering sample gray-scale differences $g_1 \sim g_N$ of the N sets of sample data.

In the above step S3131, endpoint values of the determination ranges are set, for example, at equal intervals. For example, the endpoint values are set to 5, 10, 15, 20, etc.

In some examples, the endpoint values of the determination ranges are set according to past detection data of substrates on the production line. For example, the past detection data indicates that:

1) Film thickness differences corresponding to gray-scale differences within 0~5 basically meet the requirements of production design;

2) The probability of film thickness differences corresponding to gray-scale differences within 5~20 meeting the requirements of production design is high;

3) The probability of film thickness differences corresponding to gray-scale differences within 20~50 not meeting the requirements of production design is high, and the risk of a corresponding product being unqualified is high; and 4) Film thickness differences corresponding to gray-scale differences of over 50 basically do not meet the requirements of production design.

Then, the determination ranges are set to: [0, 5]; (5, 20); (20, 50]; and (50, +∞).

In some examples, the number of determination ranges is determined according to the requirement on accuracy of the detection results in actual situations. If high accuracy of the detection results is required, a large number of determination ranges may be set, so that a more accurate degree of defect of the substrate may be obtained. On the contrary, if high accuracy of the detection results is not required, a small number of determination ranges may be set for quick detection.

Cases in which there are a plurality of determination ranges are described above. Of course, in some other examples, a single determination range is set, such as, [0, +∞).

In some embodiments, the lower limit of the determination range is set to the maximum gray-scale fluctuation allowed in the gray-scale normal region of the gray-scale image of the substrate to be detected. Meanwhile, the upper limit of the determination range is set to a corresponding gray-scale difference in a case where the film thickness difference of the substrate to be detected is equal to an average film thickness of the substrate to be detected.

For example, the determination range may be set to [3, 50]. If the gray-scale difference is lower than 3, the impact of the film thickness difference on the gray-scale value is not reflected, therefore it may be considered as normal fluctuation of the gray-scale value. If the gray-scale difference is higher than 50, the corresponding film thickness difference is much larger than the threshold value of the film thickness difference required by the process (for example, 0.05 μm). The threshold value is usually set to be equal to the film thickness, and does not have high value in being used for reference.

In S3132, an average value of all the sample relationship coefficients corresponding to sample gray-scale differences falling into each determination range is calculated to obtain the relationship coefficient x corresponding to the determination range.

It will be noted that, if a plurality of determination ranges are set in step S3131, then in step S3132, a corresponding relationship coefficient x is obtained for each determination range. Alternatively, if a single determination range is set in step S3131, then in step S3132, all the sample gray-scale differences fall into the determination range, and the relationship coefficient x is an average value of $x_1$~$x_N$.

As for step S32, according to the description of the process of step S31 above, the relationship coefficient x is calculated based on the sample relationship coefficients $x_i$ of each set of sample data, and the sample relationship coefficient $x_i$ is obtained by dividing the sample thickness difference $d_i$ by the sample gray-scale difference $g_i$ of a corresponding set of sample data. Therefore, in the step S32 above, the gray-scale difference g of the substrate to be detected and the relationship coefficient x are known, according to the relational expression d=g×x, the estimated value of the film thickness difference d between the gray-scale abnormal region and the gray-scale normal region in the gray-scale image of the substrate to be detected may be obtained through calculation.

Based on the implementation manner of calculating the relationship coefficient x in the above step S221, the determination range of each gray-scale difference corresponds to a relationship coefficient x, and therefore the process of the above step S222 is, for example, described as follows.

An determination range into which the gray-scale difference g falls is determined, and then a relationship coefficient x corresponding to the determination range is calculated. Then, the estimated value of the film thickness difference d is calculated to be a product of the gray-scale difference g and the relationship coefficient x according to the relational expression d=g×x. In this way, the calculated estimated value of the film thickness difference d of the substrate to be detected is closer to the actual value of the film thickness difference, which improves the accuracy of determining whether the substrate to be detected is qualified.

In some embodiments, referring to FIG. 3, the step S4 above includes the following steps S41 and S42.

In S41, a fluctuation range, which ranges from (d−y) to (d+y), of the estimated value of the film thickness difference d is determined. Here, y is a compensation coefficient representing an allowable error of the estimated value of the film thickness difference d relative to an actual value of the film thickness difference d' of the substrate to be detected.

In fact, y is a relatively small value, which can be determined according to the accuracy requirements of defect detection of the actual production process. That is, if the accuracy of defect detection is high, y may be set small; if the accuracy of defect detection is low, y may be set large.

In the step S41 above, by setting the fluctuation range of the estimated value of film thickness difference d (i.e. d−y~d+y), a validity and accuracy of determining whether the substrate to be detected may be improved.

In S42, the fluctuation range d−y~d+y is compared with a pre-set threshold value of the film thickness difference $d_{max}$. The threshold value of the film thickness difference $d_{max}$ is a maximum film thickness difference allowed for the substrate to be qualified. There are, for example, three results as follows.

Result 1: if d+y≤$d_{max}$, it indicates that the estimated value of the film thickness difference d of the substrate to be detected will still be less than or equal to the threshold value of the film thickness difference threshold $d_{max}$ even if it fluctuates upwards by y, and the probability of the actual value of the film thickness difference d' of the substrate to be detected being less than or equal to the threshold value of the film thickness difference $d_{max}$ is high, and therefore it may be determined that the substrate to be detected is qualified.

Result 2: If d−y>$d_{max}$, it indicates that the estimated value of the film thickness difference d of the substrate to be detected is still larger than the threshold value of the film thickness difference $d_{max}$ even if it fluctuates downwards by y, and the probability of the actual value of the film thickness difference d' of the substrate to be detected being larger than the threshold value of the film thickness difference $d_{max}$ is high, and therefore it may be determined that the substrate to be detected is unqualified.

Herein, in some examples, in response to the determination of the substrate being unqualified, an alarm is automatically sent to warn the staff.

Result 3: If $d-y \leq d_{max}$ and $d+y > d_{max}$, it indicates that the probability of the estimated value of the film thickness difference d of the substrate to be detected being less than or equal to the threshold value of the film thickness difference $d_{max}$, and the probability of the estimated value of the film thickness difference d being larger than the threshold value of the film thickness difference $d_{max}$, are both low.

In a case of the result 3 above, the actual value of the film thickness difference d' of the substrate to be detected is measured, and then d' and $d_{max}$ are compared: if $d' \leq d_{max}$, it is determined that the substrate to be detected is qualified; if $d' > d_{max}$, it is determined that the substrate to be detected is unqualified.

Similarly, in some examples, in response to the determination of the substrate being unqualified, an alarm is automatically sent to warn the staff.

It will be noted that, after the above processes of calculating the estimated value of the film thickness difference d, and determining whether the substrate to be detected is qualified according to the estimated value of the film thickness difference d, most of the substrates to be detected may be determined to be qualified or not. The number of substrates to be detected during detection of which Result 3 occurs is extremely small. Therefore, in the case of Result 3, even if it is necessary to measure the actual value of the film thickness difference d' of the substrate to be detected, it will have little effect on production efficiency.

Furthermore, when the Result 3 occurs, it may indicate that the at least one determination range of the gray-scale difference and the allowed fluctuation range of the estimated value of the film thickness difference d may be set unreasonably. Therefore, in such cases, the above parameters may be appropriately adjusted, so that when performing defect detection on the substrate to be detected again, the occurrence of Result 3 is avoided, thereby further improving the accuracy of detection and saving detection time.

It will be noted that sequence numbers in the above methods of detecting defects provided by the embodiments of the present disclosure are only numbers for convenience of description, and do not strictly represent actual step sequences. Those skilled in the art have the ability to adjust the order of the steps after having learned the technical solutions of the embodiments of the present disclosure, which should fall within the scope disclosed in the embodiments of the present disclosure.

Figure 11:
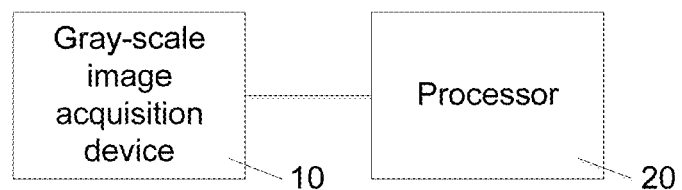
FIG. 11 is a diagram showing a structure of an apparatus of detecting defects according to some embodiments of the present disclosure.

Some embodiments of the present disclosure provide an apparatus of detecting defects. As shown in FIG. 11, the apparatus of detecting defects 01 includes a gray-scale image acquisition device 10 and a processor 20 connected to each other.

The gray-scale image acquisition device 10 is configured to obtain a gray-scale image of the substrate to be detected. The gray-scale image acquisition device 10 is, for example, a linear camera or other photographic device. As for the process of the gray-scale image acquisition device 10 in obtaining a gray-scale image, reference may be made to relevant description of step S1 in the method of detecting defects above, and details are not described herein again.

The processor 20 is configured to obtain a gray-scale difference g between different regions in the gray-scale image, calculate an estimated value of a film thickness difference d between the different regions in the gray-scale image according to the gray-scale difference g, and determine whether the substrate to be detected is qualified according to the estimated value of the film thickness difference d. As for the working process of the processor 20, reference may be made to relevant description of steps S2-S4 in the method of detecting defects above, and details are not described herein again.

Figure 12:
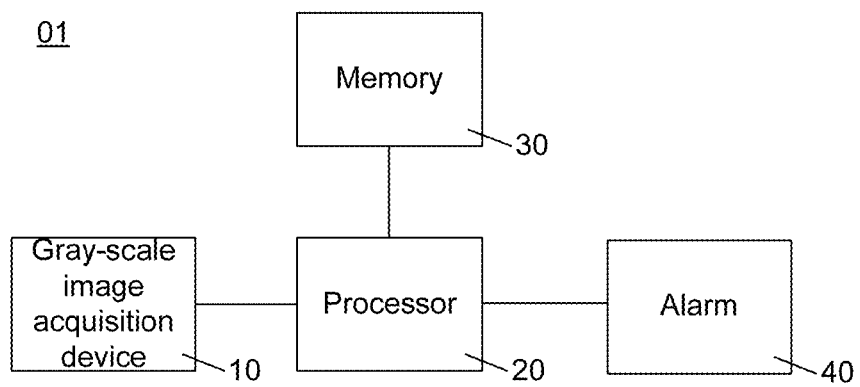
FIG. 12 is a diagram showing a structure of another apparatus of detecting defects according to some embodiments of the present disclosure.

In some embodiments, as shown in FIG. 12, the apparatus of detecting defects 01 further includes an alarm 40 connected to the processor 20 (or an alarm disposed in the processor 20), and the alarm 40 is configured to send an alarm in response to the determination of the substrate to be detected being unqualified by the processor 20.

In some embodiments, as shown in FIG. 12, the processor 20 is configured to determine whether there is a gray-scale abnormal region in the gray-scale image obtained by the gray-scale image acquisition device 10. In addition, the processor is configured to define the gray-scale abnormal region and a gray-scale normal region in the gray-scale image in a case where there is a gray-scale abnormal region in the gray-scale image, and to determine that the substrate to be detected is qualified in a case where there is no gray-scale abnormal regions in the gray-scale image. The gray-scale abnormal region is a region in which the gray-scale value is too large or too small in the gray-scale image.

As for the working process of determination, reference made be made to relevant description of step S21 in the method of detecting defects above, and details are not described herein again.

In some embodiments, the processor 20 is configured to, in response to a gray-scale abnormal region existing in the gray-scale image of the substrate to be detected, calculate the gray-scale difference g between the gray-scale abnormal region and the gray-scale normal region, and calculate an estimated value of the film thickness difference d between the gray-scale abnormal region and the gray-scale normal region according to the gray-scale difference g. As for the processes of calculating the gray-scale difference g and then calculating the estimated film thickness difference d, reference may be made to relevant description of steps S22 and S3 in the method of detecting defects above, and details are not described herein again.

The processor 20 is further configured to determine whether the substrate to be detected is qualified according to the estimated value of the film thickness difference d. As for the process of determination, reference may be made to relevant description of step S4 in the method of detecting defects above, and details are not described herein again.

With continued reference to FIG. 12, in some embodiments, the apparatus of detecting defects 01 further includes a memory 30, which is connected to the processor 20 and configured to store the relationship coefficient x. The relationship coefficient x represents the relationship between the sample film thickness difference and the sample gray-scale difference in the sample data, and is used by the processor 20 when calculating the estimated value of the film thickness difference d of the substrate to be detected.

Based on this, in some embodiments, the processor 20 is configured to calculate a gray-scale difference g between the gray-scale abnormal region and the gray-scale normal region of the substrate to be detected, read the relationship coefficient x from the memory 50, and calculate the estimated value of the film thickness difference d between the gray-scale abnormal region and the gray-scale normal region according to the relational expression $d = g \times x$ between the estimated value of the film thickness difference d and the gray-scale difference g.

In some embodiments, the processor 20 is further configured to determine a defect type of a gray-scale abnormal region of the substrate to be detected according to a distribution of image points in the gray-scale abnormal region, that is: determine whether a defect of the gray-scale abnormal region of the substrate is Slit Mura or Pin Mura.

The technical solutions in some embodiments of the present disclosure are exemplarily described below with reference to the method and apparatus of detecting defects provided by the embodiments of the present disclosure.

First, pre-calculated or pre-set data is stored into the memory 40 of the apparatus of detecting defects 01, and the data includes determination ranges of the gray-scale difference, relationship coefficients x, correction coefficients y, and fluctuation ranges of an estimated value of the thickness difference, and conditions under which the substrate is determined as qualified. Moreover, in order to improve the accuracy of defect detection, corresponding data is determined for different types of defects.

Referring to Table 2 and Table 3 below, Table 2 shows the basis for determining Slit Mura, and Table 3 shows the basis for determining Pin Mura.

TABLE 2

| Slit Mura | | | | |
|---|---|---|---|---|
| Determination range | Relationship coefficient x | Correction coefficient y | Fluctuation range | Conditions for the substrate to be qualified |
| d ≤ 5 | $x_a$ | $y_a$ | $x_a \pm y_a$ | 1. d + y ≤ 0.05, qualified; |
| 5 < d ≤ 20 | $x_b$ | $y_b$ | $x_b \pm y_b$ | 2. d − y > 0.05, unqualified; |
| 20 < d ≤ 50 | $x_c$ | $y_c$ | $x_c \pm y_c$ | 3. d − y ≤ 0.05 and d + y > |
| d > 50 | $x_d$ | $y_d$ | $x_d \pm y_d$ | 0.05, to be determined. |

TABLE 3

| Pin Mura | | | | |
|---|---|---|---|---|
| Determination range | Relationship coefficient x | Correction coefficient y | Fluctuation range | Conditions for the substrate to be qualified |
| d ≤ 10 | $x_a$ | $y_a$ | $x_a \pm y_a$ | 1. d + y ≤ 0.05, qualified; |
| 10 < d ≤ 30 | $x_b$ | $y_b$ | $x_b \pm y_b$ | 2. d − y > 0.05, unqualified; |
| 30 < d ≤ 50 | $x_c$ | $y_c$ | $x_c \pm y_c$ | 3. d − y ≤ 0.05 and d + y > |
| d > 50 | $x_d$ | $y_d$ | $x_d \pm y_d$ | 0.05, to be determined. |

Then, the gray-scale image acquisition device 10 of the apparatus of detecting defects 01 obtains a gray-scale image of the substrate to be detected, and the processor 20 first determines whether there is an image point with an abnormal gray-scale value in the gray-scale image; if yes, determines that there is a gray-scale abnormal region in the gray-scale image, and that the region corresponding to the image point with the abnormal gray-scale value is a gray-scale abnormal region of the gray-scale image, and that the region with normal gray-scale values is a gray-scale normal region of the gray-scale image.

Moreover, the processor 20 further determines whether the defect in a corresponding region of the substrate to be detected is Slit Mura or Pin Mura according to the distribution of the image points with abnormal gray-scale values.

If it is Slit Mura, the processor 20 further calculates a gray-scale difference g between the gray-scale abnormal region and the gray-scale normal region, acquires the relationship coefficient x corresponding to the determination range into which the gray-scale difference g falls from the table corresponding to Slit Mura, and calculates an estimated value of the film thickness difference d between the gray-scale abnormal region and the gray-scale normal region of the substrate to be detected.

Finally, the processor 20 determines a correction coefficient y corresponding to the determination range into which the gray-scale difference g falls, determines a fluctuation range of the estimated value of the film thickness difference d, and determines whether the substrate to be detected is qualified according to the fluctuation range and the conditions for determining whether the substrate to be detected is qualified in the table corresponding to Slit Mura.

It will be noted that, for processing measures of substrates determined as "to be determined", reference may be made to relevant description of the result 3 in step S42 of the above method of detecting defects, and details are not described herein again.

Some embodiments of the present disclosure provide a non-transitory computer-readable storage medium storing executable instructions that, when executed by an apparatus for detecting defects, cause the apparatus to perform the steps of the method of detecting defects as described in the above embodiments.

The beneficial effects of the above computer-readable storage medium are the same as those of the method of detecting defects provided by the above embodiments, and are not described herein again.

Some embodiments of the present disclosure provide a computer device including a memory, a processor and a camera. The memory is configured to store executable instructions that, when executed by the processor, cause the computer device to perform the steps of the method of detecting defects according to the above embodiments.

The above embodiments are merely illustrative embodiments of the disclosure, but the disclosure is not limited thereto. It will be apparent to those skilled in the art that various changes and modifications can be made therein within the technical range of the disclosure, which are also considered to be within the scope of the disclosure. Therefore, the protection scope of the present disclosure shall be subject to the protection scope of the claims.

What is claimed is:

1. A method of detecting defects, comprising:
obtaining a gray-scale image of a substrate to be detected;
obtaining a gray-scale difference g between different regions in the gray-scale image;
calculating an estimated value of a film thickness difference d between the different regions in the gray-scale image according to the gray-scale difference g; and
determining whether the substrate to be detected is qualified according to the estimated value of the film thickness difference d,
wherein obtaining the gray-scale difference g between different regions in the gray-scale image, comprises:
determining whether there is a gray-scale abnormal region in the gray-scale image, wherein the gray-scale abnormal region is a region in which a gray-scale value is too large or too small in the gray-scale image;
defining the gray-scale abnormal region and a gray-scale normal region in the gray-scale image in response to determining that there is the gray-scale abnormal region in the gray-scale image, and then proceeding to a next step;
determining that the substrate to be detected is qualified in response to determining that there is no gray-scale abnormal region in the gray-scale image; and calculating the gray-scale difference g between the gray-scale abnormal region and the gray-scale normal region, and wherein calculating the estimated value of the film thickness difference d between the different regions in the gray-scale image according to the gray-scale difference g, comprises:

calculating an estimated value of a film thickness difference d between the gray-scale abnormal region and the gray-scale normal region according to the gray-scale difference g.

2. The method of detecting defects according to claim 1, wherein calculating the estimated value of the film thickness difference d between the gray-scale abnormal region and the gray-scale normal region according to the gray-scale difference g, comprises:

obtaining a relationship coefficient x representing a relationship between a sample film thickness difference and a sample gray-scale difference in sample data; and calculating the estimated value of the film thickness difference d to be a product of the relationship coefficient x and the gray-scale difference g.

3. The method of detecting defects according to claim 2, wherein obtaining the relationship coefficient x representing the relationship between the sample film thickness difference and the sample gray-scale difference in sample data, comprises:

collecting N sets of sample data, each set of sample data comprising a sample film thickness difference $d_i$ and a sample gray-scale difference $g_i$ corresponding to a sample film thickness difference $d_i$, wherein N is greater than or equal to 2, i ranges from 1 to N, and $d_1 \sim d_N$ differ from one another;

calculating a sample relationship coefficient $x_i$ of each set of sample data by dividing the sample film thickness difference $d_i$ by the sample gray-scale difference $g_i$, wherein the sample relationship coefficient $x_i$ represents a relationship between the sample film thickness difference $d_i$ and the sample gray-scale difference $g_i$ in a corresponding set of sample data; and calculating the relationship coefficient x according to sample relationship coefficients $x_1 \sim x_N$ of the N sets of sample data.

4. The method of detecting defects according to claim 3, wherein calculating the relationship coefficient x according to sample relationship coefficients $x_1 \sim x_N$ of the N sets of sample data, comprises:

setting at least one determination range of the gray-scale difference, a collection of the at least one determination range being a continuous numerical range covering sample gray-scale differences $g_1 \sim g_N$ of the N sets of sample data; and calculating an average value of sample relationship coefficients corresponding to sample gray-scale differences falling into each of the at least one determination range to obtain a relationship coefficient x of a corresponding determination range.

5. The method of detecting defects according to claim 4, wherein before calculating the estimated value of the film thickness difference d to be a product of the relationship coefficient x and the gray-scale difference g, the method further comprises:

determining a determination range into which the gray-scale difference g falls, and then determining a relationship coefficient x corresponding to the determination range.

6. The method of detecting defects according to claim 1, wherein determining whether the substrate to be detected is qualified according to the estimated value of the film thickness difference d, comprises:

determining a fluctuation range, which ranges from (a difference between d and y) to (a sum of d and y), of the estimated value of the film thickness difference d, wherein y is a compensation coefficient representing an allowable error of the estimated value of the film thickness difference d relative to an actual value of the film thickness difference d' of the substrate to be detected;

comparing the fluctuation range with a pre-set threshold value of the film thickness difference $d_{max}$, wherein the threshold value of the film thickness difference $d_{max}$ is a maximum film thickness difference allowed for the substrate to be qualified;

determining that the substrate to be detected is qualified in response to the sum of d and y being smaller than or equal to $d_{max}$;

determining that the substrate to be detected is unqualified in response to the difference between d and y being greater than $d_{max}$;

measuring the actual value of the film thickness difference d' in response to the difference between d and y being smaller than or equal to $d_{max}$ and the sum of d and y being greater than $d_{max}$, and comparing the actual value of the film thickness difference d' with the threshold value of the film thickness difference $d_{max}$;

determining that the substrate to be detected is qualified in response to d' being smaller than or equal to $d_{max}$;

determining that the substrate to be detected is unqualified in response to d' being greater than $d_{max}$.

7. The method of detecting defects according to claim 1, wherein obtaining the gray-scale image of the substrate to be detected, comprises:

capturing an image of the substrate to be detected to obtain a captured image; and converting the captured image into a gray-scale image.

8. The method of detecting defects according to claim 1, wherein determining whether there is a gray-scale abnormal region in the gray-scale image, wherein the gray-scale abnormal region is a region in which a gray-scale value is too large or too small in the gray-scale image; defining the gray-scale abnormal region and a gray-scale normal region in the gray-scale image in response to determining that there is a gray-scale abnormal region in the gray-scale image, and then proceeding to a next step; determining if the substrate to be detected is qualified in response to determining that there is no gray-scale abnormal region in the gray-scale image, comprises:

obtaining a gray-scale value of each image point in the gray-scale image;

determining whether the gray-scale value of each image point is normal;

determining that there is a gray-scale abnormal region in the gray-scale image in response to determining that a gray-scale value of an image point is abnormal, and defining a region corresponding to image points with abnormal gray-scale values as a gray-scale abnormal region, and a region corresponding to image points with normal gray-scale values as a gray-scale normal region, and then proceeding to the step of calculating the gray-scale difference g between the gray-scale abnormal region and the gray-scale normal region; and determining that there is no gray-scale abnormal region in the gray-scale image in response to determining that ray-scale values of all image points are normal, and then determining that the substrate to be detected is qualified.

9. The method of detecting defects according to claim 8, wherein
each image point comprises a single pixel in the gray-scale image; or,
each image point comprises at least a column of pixels in the gray-scale image; or,
each image point comprises at least a row of pixels in the gray-scale image.

10. The method of detecting defects according to claim 1, wherein calculating the gray-scale difference g between the gray-scale abnormal region and the gray-scale normal region, comprises:
determining a maximum gray-scale value in the gray-scale values of image points with abnormal gray-scale values in a case where gray-scale values of image points with abnormal gray-scale values are larger than gray-scale values of image points with normal gray-scale values, and calculating an average gray-scale value of image points with normal gray-scale values;
determining a minimum gray-scale value in the gray-scale values of image points with abnormal gray-scale values in a case where the gray-scale values of image points with abnormal gray-scale values are smaller than the gray-scale values of image points with normal gray-scale values, and calculating an average gray-scale value of image points with normal gray-scale values; and
subtracting the average gray-scale value from the maximum gray-scale value or subtracting the minimum gray-scale value from the average gray-scale value to obtain the gray-scale difference g.

11. A non-transitory computer-readable storage medium storing executable instructions that, when executed by an apparatus for detecting defects, cause the apparatus to perform steps of the method of detecting defects according to claim 1.

12. An apparatus for detecting defects, comprising:
a gray-scale image acquisition device configured to obtain a gray-scale image of a substrate to be detected;
a processor connected to the gray-scale image acquisition device, the processor being configured to obtain a gray-scale difference g between different regions in the gray-scale image, calculate an estimated value of a film thickness difference d between the different regions in the gray-scale image according to the gray-scale difference g, and determine whether the substrate to be detected is qualified according to the estimated value of the film thickness difference d,
wherein the processor is configured to:
determine whether there is a gray-scale abnormal region in the gray-scale image, wherein the gray-scale abnormal region is a region in which a gray-scale value is too large or too small in the gray-scale image;
define the gray-scale abnormal region and a gray-scale normal region in the gray-scale image in response to determining that there is the gray-scale abnormal region in the gray-scale image;
determine that the substrate to be detected is qualified in response to determining that there is no gray-scale abnormal regions in the gray-scale image;
calculate the gray-scale difference g between the gray-scale abnormal region and the gray-scale normal region;
calculate an estimated value of a film thickness difference d between the gray-scale abnormal region and the gray-scale normal region according to the gray-scale difference g; and
determine whether the substrate to be detected is qualified according to the estimated value of the film thickness difference d.

13. The apparatus for detecting defects according to claim 12, further comprising a memory connected to the processor, the memory being configured to store a relationship coefficient x, wherein the relationship coefficient x represents a relationship between a sample film thickness difference and a sample gray-scale difference in sample data; and
the processor is configured to calculate a gray-scale difference g between the gray-scale abnormal region and the gray-scale normal region, read the relationship coefficient x from the memory, and calculate the estimated value of the film thickness difference d between the gray-scale abnormal region and the gray-scale normal region to be a product of the relationship coefficient x and the gray-scale difference g.

14. The apparatus for detecting defects according to claim 12, wherein the processor is further configured to determine a defect type of a corresponding region of the substrate to be detected according to a distribution of image points in the gray-scale abnormal region.

15. The apparatus for detecting defects according to claim 12, further comprising an alarm connected to the processor, the alarm being configured to send an alarm in response to determining that the substrate to be detected is unqualified.

16. The apparatus for detecting defects according to claim 12, wherein the gray-scale image acquisition device comprises a linear camera.

* * * * *